US008819447B2

(12) United States Patent
Shipley et al.

(10) Patent No.: US 8,819,447 B2
(45) Date of Patent: Aug. 26, 2014

(54) SECURE STORAGE OF PROTECTED DATA IN A WIRELESS COMMUNICATION DEVICE

(75) Inventors: Trevor Daniel Shipley, Olathe, KS (US); Robert L. Spanel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 627 days.

(21) Appl. No.: 12/720,928

(22) Filed: Mar. 10, 2010

(65) Prior Publication Data

US 2011/0225418 A1 Sep. 15, 2011

(51) Int. Cl.
*G06F 21/00* (2013.01)
*G06F 21/74* (2013.01)
*G06F 21/62* (2013.01)
*G06F 21/79* (2013.01)

(52) U.S. Cl.
CPC .............. *G06F 21/74* (2013.01); *G06F 21/62* (2013.01); *G06F 21/79* (2013.01)
USPC ............................ 713/189; 713/164; 713/166

(58) Field of Classification Search
CPC .......... G06F 21/74; G06F 21/62; G06F 21/79
USPC ................. 713/189–194, 164, 166; 726/2–21
See application file for complete search history.

(56) References Cited

U.S. PATENT DOCUMENTS

| | | | |
|---|---|---|---|
| 5,144,692 A | 9/1992 | Baker et al. | |
| 5,960,172 A * | 9/1999 | Hwang | 726/34 |
| 6,192,477 B1 * | 2/2001 | Corthell | 726/11 |
| 7,139,915 B2 | 11/2006 | DeTreville | |
| 7,207,041 B2 | 4/2007 | Elson et al. | |
| 7,765,399 B2 * | 7/2010 | O'Brien | 713/164 |
| 2002/0066023 A1 | 5/2002 | McIlroy | |
| 2003/0135771 A1 * | 7/2003 | Cupps et al. | 713/320 |
| 2005/0062603 A1 | 3/2005 | Fuerst et al. | |
| 2005/0234967 A1 | 10/2005 | Draluk et al. | |
| 2006/0053426 A1 | 3/2006 | Dive-Reclus et al. | |
| 2006/0129848 A1 | 6/2006 | Paksoy et al. | |
| 2006/0140144 A1 | 6/2006 | Bruner et al. | |
| 2006/0165060 A1 | 7/2006 | Dua | |
| 2007/0199046 A1 * | 8/2007 | O'Brien | 726/2 |
| 2007/0226493 A1 * | 9/2007 | O'Brien et al. | 713/166 |
| 2007/0226517 A1 * | 9/2007 | O'Brien et al. | 713/189 |
| 2007/0250614 A1 | 10/2007 | Szabo | |
| 2008/0016343 A1 * | 1/2008 | Holden et al. | 713/166 |
| 2009/0154701 A1 * | 6/2009 | Kosaraju et al. | 380/270 |
| 2009/0193251 A1 | 7/2009 | Brabson et al. | |
| 2010/0011447 A1 * | 1/2010 | Jothimani | 726/27 |
| 2012/0079282 A1 * | 3/2012 | Lowenstein et al. | 713/189 |

* cited by examiner

*Primary Examiner* — Chau Le
*Assistant Examiner* — Don Zhao (57) ABSTRACT

A wireless communication device comprises first processing circuitry configured to execute an RF operating system and second processing circuitry configured to execute an open operating system, wherein the first processing circuitry is linked to a secure memory device inaccessible to the second processing circuitry. The RF operating system is configured to receive protected data and store the protected data in the secure memory device. The open operating system is configured to receive a request for the protected data from one of a plurality of user applications and transfer the request to the RF operating system. In response to the request for the protected data, the RF operating system is configured to retrieve the protected data from the secure memory device, encrypt the protected data, and transfer the encrypted protected data to the open operating system for delivery to the one of the user applications associated with the request.

20 Claims, 5 Drawing Sheets

SECURE STORAGE OF PROTECTED DATA IN A WIRELESS COMMUNICATION DEVICE

TECHNICAL BACKGROUND

Wireless communication networks typically include wireless communication devices which, via a wireless access node, communicate with further communication networks and equipment. Individuals have become increasingly reliant on wireless communication devices to send and receive information. For example, an individual may utilize a wireless communication device for voice communications, research, business, and entertainment. Typically, an operating system is installed on the wireless communication device to manage and coordinate the various functions that the device performs.

One example of an operating system for a wireless communication device is an open operating system. An open operating system has publically-disclosed source code to facilitate development of applications for the open operating system by third parties. However, due to the open source code, an open operating system may also enable third parties to write malicious applications that exploit the open operating system. In addition to an open operating system, a wireless communication device may have a second operating system for managing radio frequency (RF) communications and modem operations. This RF operating system is a separate, closed operating system that allows RF operations to execute on different circuitry than the open operating system.

Functions related to device management are typically handled by a device management client application installed on the wireless communication device. The device management client communicates with a device management server typically located in a back-office system of a wireless communication network to provide device provisioning, activation, configuration, software upgrades, and fault management. Critical parameters are typically passed from the device management server to the device management client to support these functions using over-the-air device management protocols, such as open mobile alliance device management (OMA-DM) or over-the-air service provisioning (OTASP).

OVERVIEW

A wireless communication device comprises first processing circuitry configured to execute a radio frequency (RF) operating system and second processing circuitry configured to execute an open operating system and a plurality of user applications executing on the open operating system, wherein the first processing circuitry is linked to a secure memory device inaccessible to the second processing circuitry. The RF operating system is configured to receive protected data and unprotected data and store the protected data and the unprotected data in the secure memory device. The open operating system is configured to receive a first request for the unprotected data from one of the user applications and transfer the first request to the RF operating system. In response to the first request for the unprotected data, the RF operating system is configured to retrieve the unprotected data from the secure memory device and transfer the unprotected data to the open operating system for delivery to the one of the user applications associated with the first request. The open operating system is configured to receive a second request for the protected data from one of the user applications and transfer the second request to the RF operating system. In response to the second request for the protected data, the RF operating system is configured to retrieve the protected data from the secure memory device, encrypt the protected data, and transfer the encrypted protected data to the open operating system for delivery to the one of the user applications associated with the second request.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
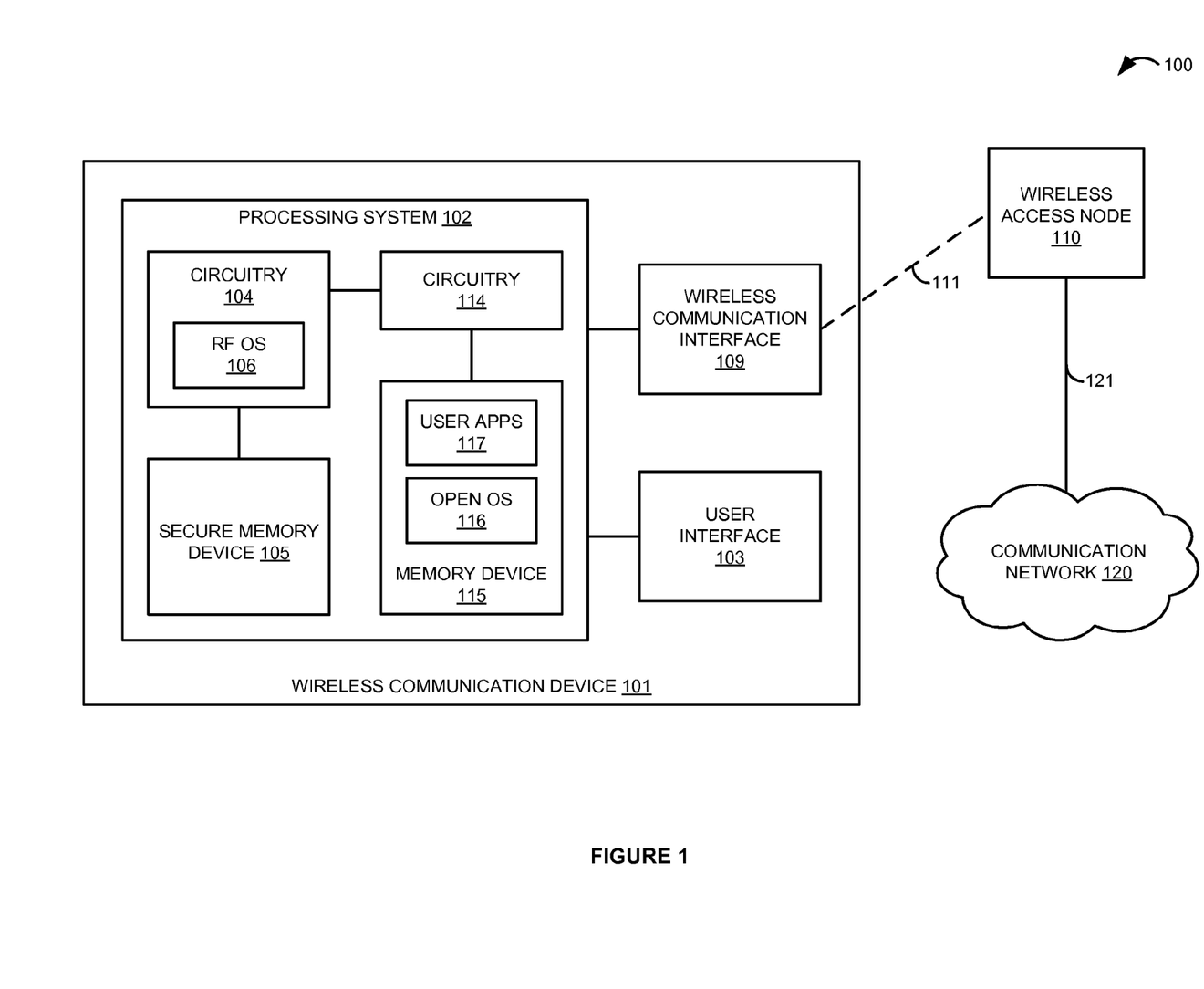
FIG. 1 is a block diagram that illustrates a communication system.

FIG. 1 is a block diagram that illustrates communication system 100. Communication system 100 includes wireless communication device 101, wireless access node 110, and communication network 120. Wireless communication device 101 is in communication with wireless access node 110 over wireless communication link 111. Wireless access node 110 communicates with communication network 120 over communication link 121.

Wireless communication device 101 comprises processing system 102, user interface 103, and wireless communication interface 109. Processing system 102 is linked to user interface 103 and wireless communication interface 109. Processing system 102 includes processing circuitry 104, secure memory device 105, processing circuitry 114, and memory device 115. Processing circuitry 104 includes and executes radio frequency (RF) operating system 106. Processing circuitry 104 is linked to secure memory device 105. Processing circuitry 114 is linked to processing circuitry 104 and memory device 115 that stores open operating system 116 and user application software 117.

Figure 2:
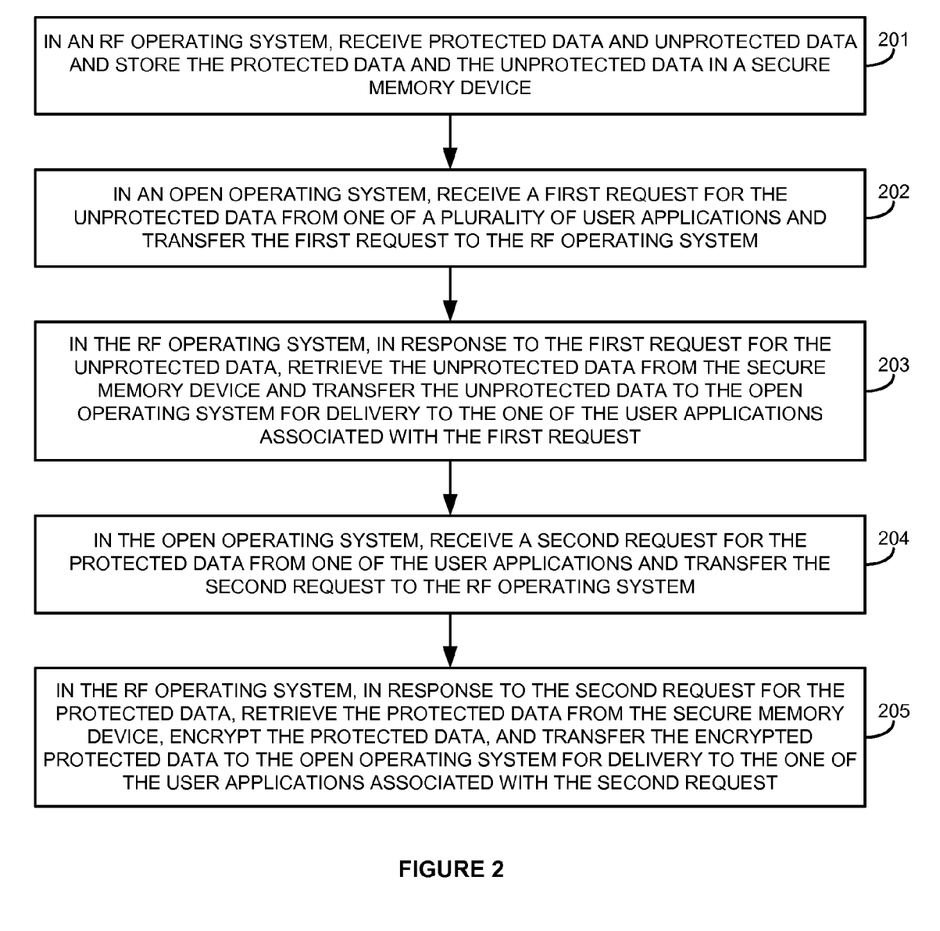
FIG. 2 is a flow diagram that illustrates an operation of a wireless communication device in the communication system.

FIG. 2 is a flow diagram that illustrates an operation of wireless communication device 101 in communication system 100. The steps of the operation are indicated below parenthetically. In operation, processing circuitry 104 of wireless communication device 101 is configured to execute RF operating system 106, and processing circuitry 104 is linked to secure memory device 105 which is inaccessible to processing circuitry 114. Processing circuitry 114 is configured to execute open operating system 116 and a plurality of user applications 117 executing on open operating system 116.

In FIG. 2, RF operating system 106 receives protected data and unprotected data and stores the protected data and the unprotected data in secure memory device 105 (201). The protected data could comprise any sensitive data that requires safeguarding, such as a user's personal information (a username, password, personal identification number (PIN), credit card number, or International Mobile Subscriber Identity (IMSI), for example), identification information for device 101 (such as a telephone number, Electronic Serial Number (ESN), Mobile Station Identifier (MSID), Mobile Equipment Identifier (MEID), International Mobile Equipment Identity (IMEI), packet address, or media access control (MAC) address), or any other information that a service provider of communication network 120, a user of device 101, or a manufacturer of device 101 want to protect. Conversely, the unprotected data is any information that is not designated as protected data.

In some examples, RF operating system 106 is configured to receive the protected data through wireless communication interface 109. Also, in some examples, RF operating system 106 is configured to receive the protected data from a user through user interface 103. The protected data may also be pre-stored in secure memory device 105 by a manufacturer of wireless communication device 101, or may be received from an application 117, operating system 106 or 116, or some other internal device or process of wireless communication device 101, such as a subscriber identity module (SIM) card. If RF operating system 106 receives the protected data in an encrypted form, in some examples, RF operating system 106 may be configured to decrypt and store the protected data in secure memory device 105 without encryption.

Open operating system 116 receives a first request for the unprotected data from one of the plurality of user applications 117 and transfers the first request to RF operating system 106 (202). The user applications 117 could comprise any software installed on wireless communication device 101 that is executable by open operating system 116. For example, the user applications 117 could comprise third-party software applications installed by a user of wireless communication device 101, or could comprise an application installed by a service provider of communication network 120 or a manufacturer of device 101, such as a device management application. RF operating system 106 is configured to receive the first request for the unprotected data from open operating system 116 in some examples.

In response to the first request for the unprotected data, RF operating system 106 retrieves the unprotected data from secure memory device 105 and transfers the unprotected data to open operating system 116 for delivery to the one of the user applications 117 associated with the first request (203). RF operating system 106 is configured to transfer the unprotected data to open operating system 116 in a clear text format (i.e., unencrypted) since the data is designated as unprotected data. The open operating system 116 typically receives the unprotected data from RF operating system 106 and forwards the unprotected data to the one of the user applications 117 associated with the first request.

Open operating system 116 receives a second request for the protected data from one of the user applications 117 and transfers the second request to RF operating system 106 (204). In response to the second request for the protected data, RF operating system 106 retrieves the protected data from secure memory device 105, encrypts the protected data, and transfers the encrypted protected data to open operating system 116 for delivery to the one of the user applications 117 associated with the second request (205). In some examples, RF operating system 106 is configured to encrypt the protected data based on receiving the second request from open operating system 116. In other words, since the second request is received from open operating system 116 and the data is designated as protected data, RF operating system 106 is configured to encrypt the protected data prior to transferring the protected data to open operating system 116. In some examples, RF operating system 106 is configured to encrypt the protected data using a shared secret key. However, in some examples, RF operating system 106 is configured to transfer the protected data without encryption to an internal process or application executing on RF operating system 106 and/or processing circuitry 104.

Advantageously, RF operating system 106 safeguards the protected data through encryption prior to transferring the protected data to open operating system 116. In addition, since the protected data is stored in secure memory device 105, which is only accessible to RF operating system 106, a malicious user application of the applications 117 cannot access the protected data or the secure memory device 105. In this manner, if the malicious user application requests the protected data from open operating system 116, the malicious application will only receive encrypted protected data which it cannot decrypt, thereby ensuring the security of the protected data. However, genuine device management applications of the applications 117 can be entrusted with the encryption key in order to decrypt the protected data when the data must be transferred through open operating system 116 for a legitimate purpose.

Referring back to FIG. 1, wireless communication device 101 may comprise any device having wireless communication connectivity with hardware and circuitry programmed to function as a telecommunications device. Wireless communication device 101 may include other well-known components such as a battery and enclosure that are not shown for clarity. Wireless communication device 101 comprises processing system 102, user interface 103, and wireless communication interface 109. Processing system 102 is linked to user interface 103 and wireless communication interface 109. Examples of wireless communication device 101 include a telephone, transceiver, mobile phone, cellular phone, smartphone, computer, personal digital assistant (PDA), e-book, game console, mobile Internet device, wireless network interface card, media player, or some other wireless communication apparatus—including combinations thereof.

Wireless communication interface 109 comprises RF communication circuitry and an antenna. The RF communication circuitry typically includes an amplifier, filter, RF modulator, and signal processing circuitry. Wireless communication interface 109 may also include a memory device, software, processing circuitry, or some other communication device. Wireless communication interface 109 may use various wireless protocols, such as Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or some other wireless communication format.

User interface 103 comprises components that interact with a user to receive user inputs and to present media and/or information. User interface 103 may include a speaker, microphone, buttons, lights, display screen, touch screen, touch pad, scroll wheel, communication port, or some other user input/output apparatus—including combinations thereof. User interface 103 may be omitted in some examples.

Processing system 102 includes processing circuitry 104, secure memory device 105, processing circuitry 114, and memory device 115. Processing circuitry 104 and 114 are typically mounted on a circuit board that may also hold secure memory device 105, memory device 115, and portions of wireless communication interface 109 and user interface 103. In some examples, processing system 102 comprises a dual-core processor, and processing circuitry 104 comprises a first core of the dual-core processor and processing circuitry 114 comprises a second core of the dual-core processor.

Processing circuitry 104 is linked to secure memory device 105. Processing circuitry 104 comprises microprocessor and other circuitry that executes RF operating system 106. Secure memory device 105 comprises a disk drive, flash drive, data storage circuitry, or some other memory apparatus. RF operating system 106 comprises computer software, firmware, or some other form of machine-readable processing instructions. RF operating system 106 may include utilities, drivers, network interfaces, applications, or some other type of software. As shown in FIG. 1, RF operating system 106 is typically stored within the components of processing circuitry 104, such as on read-only memory (ROM) within circuitry 104. However, RF operating system 106 could be stored on a memory device separate from processing circuitry 104, including within secure memory device 105.

Processing circuitry 114 is linked to processing circuitry 104 and memory device 115. Processing circuitry 114 comprises microprocessor and other circuitry that executes open operating system 116. Memory device 115 comprises a disk drive, flash drive, data storage circuitry, or some other memory apparatus. Open operating system 116 and user applications 117 comprise computer software, firmware, or some other form of machine-readable processing instructions. Open operating system 116 and user applications 117 may include utilities, drivers, network interfaces, applications, or some other type of software.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Communication network 120 comprises the core network of a wireless communication provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, metropolitan-area networks (MAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport media—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
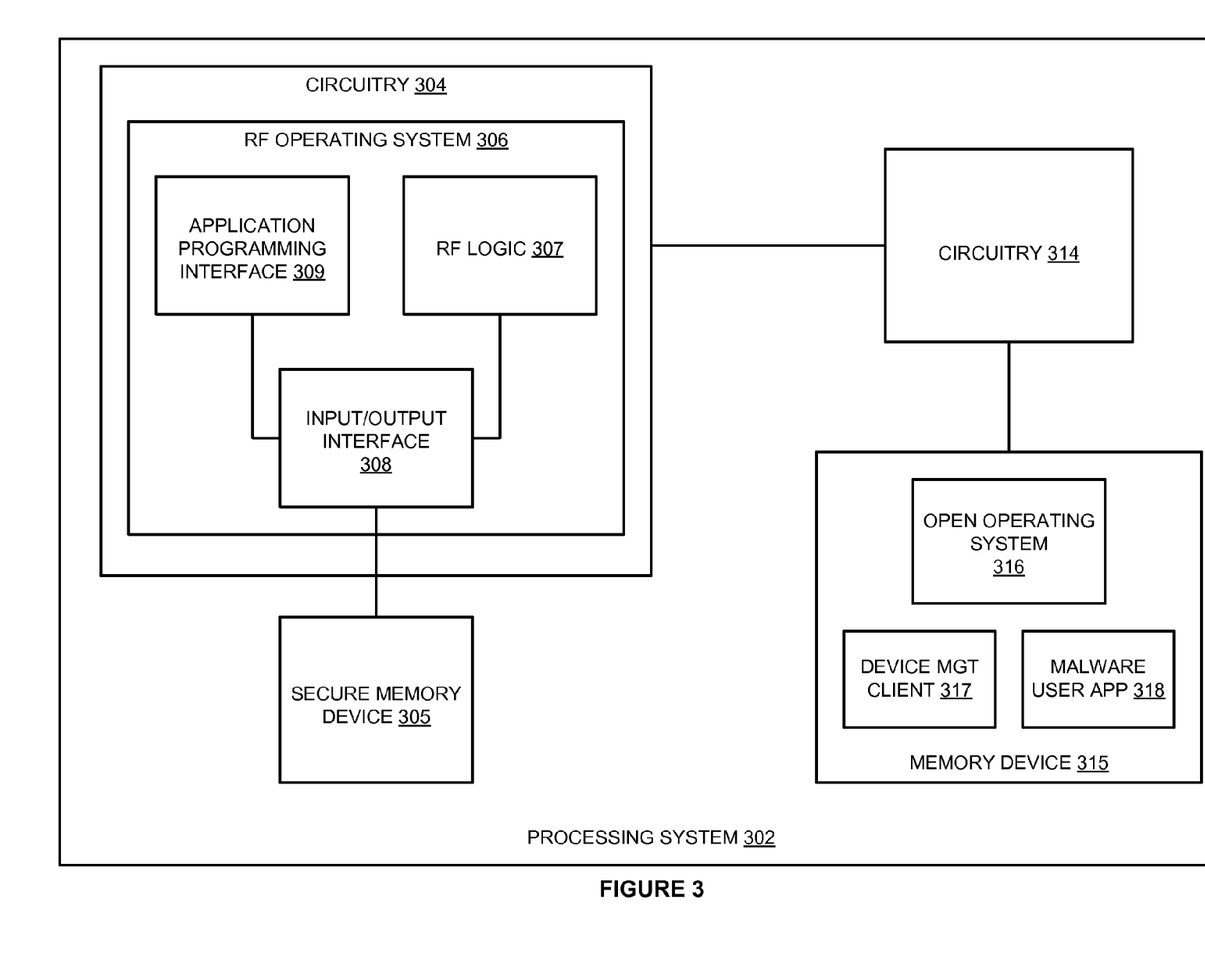
FIG. 3 is a block diagram that illustrates a processing system of a wireless communication device in an exemplary embodiment.

FIG. 3 is a block diagram that illustrates processing system 302 of a wireless communication device in an exemplary embodiment. Processing system 302 includes processing circuitry 304, secure memory device 305, processing circuitry 314, and memory device 315. Processing circuitry 304 includes and executes RF operating system 306. RF operating system 306 includes RF logic 307, input/output (I/O) interface 308, and application programming interface (API) 309. Processing circuitry 304 is linked to secure memory device 305 via I/O interface 308. Processing circuitry 314 is linked to processing circuitry 304 and memory device 315. Memory device 315 stores open operating system 316, device management client 317, and malware user application 318. Processing circuitry 314 executes open operating system 316. In the exemplary embodiment of FIG. 3, open operating system 316 comprises an android mobile operating system.

Figure 4:
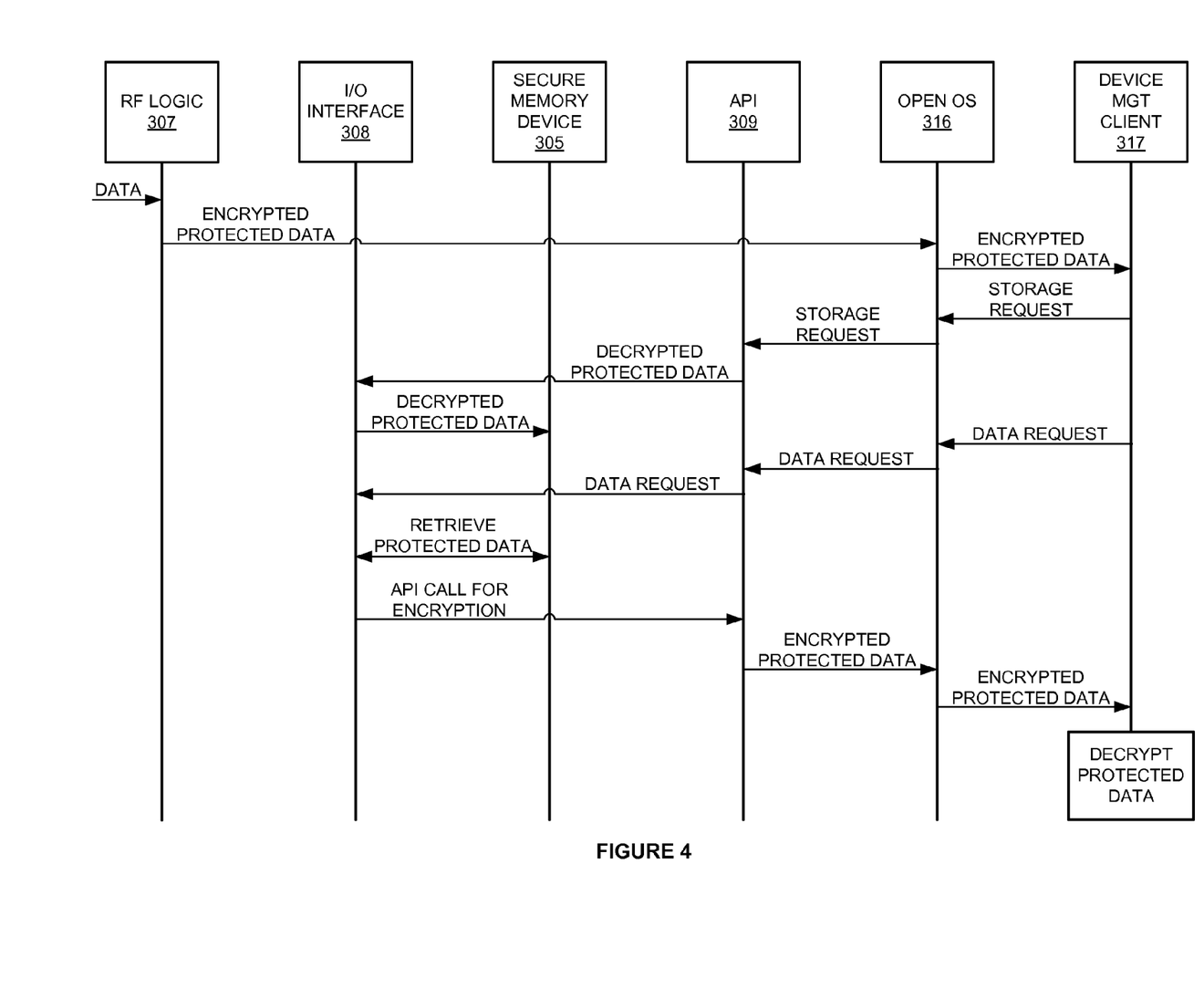
FIG. 4 is a sequence diagram that illustrates an operation of the processing system in an exemplary embodiment.

FIG. 4 is a sequence diagram that illustrates an operation of processing system 302 in an exemplary embodiment. The operation depicted in FIG. 4 facilitates the safeguarding and storage of critical parameters in secure memory device 305 according to an over-the-air device management protocol, such as open mobile alliance device management (OMA-DM) or over-the-air service provisioning (OTASP). To achieve this, a shared secret encryption key is hardcoded into processing system 302, typically within processing circuitry 304 as part of RF operating system 306. This shared secret key is then provided to a communication service provider for the wireless communication device.

To begin, data is received by RF logic 307. The data received by RF logic 307 includes protected data comprising critical parameters that have been encrypted by a device management server using the unique shared secret encryption key associated with the wireless communication device comprising processing system 302. RF logic 307 receives the encrypted data over-the-air through a wireless communication interface from a communication service provider operating the device management server.

RF logic 307 is configured to transfer the encrypted protected data to open operating system 316. Open operating system 316 then forwards the encrypted protected data to device management client 317. The device management client 317 may perform some operations on the encrypted protected data, including fully or partially decrypting the protected data to perform such operations. Regardless, device management client 317 transfers the encrypted protected data to open operating system 316 with a storage request to store the protected data in secure memory device 305. Open operating system 316 forwards the encrypted protected data with the storage request to API 309 within the RF operating system 304.

API 309 receives the API call for the storage request and decrypts the protected data using the shared secret key. API 309 then transfers the decrypted protected data to I/O interface 308. I/O interface 308 stores the decrypted protected data in secure memory device 305. In this manner, malware user application 318 cannot intercept and/or modify the critical parameters or other sensitive information contained in the encrypted protected data as it is processed by device management client 317 and transferred through open operating system 316 prior to storage in secure memory device 305. For example, malware user application 318 may comprise a rogue application designed to passively monitor the protected data as it is passed through memory device 315 between the open operating system 316 and the secure memory device 305. Since the protected data is always encrypted prior to storage in secure memory device 305, malware user application 318 cannot observe the protected data.

Subsequent to storing the protected data in secure memory device 305, device management client 317 requests the protected data from open operating system 316. The data request is forwarded by open operating system 316 to API 309 in an API call for the protected data. API 309 forwards the data request to I/O interface 308 which can directly access secure memory device 305. I/O interface 308 retrieves the protected data from secure memory device 305.

I/O interface 308 transfers an API call to API 309 for encryption of protected data 309. API 309 receives the API call with the protected data and encrypts the protected data using the shared secret key. API 309 then transfers the encrypted protected data to open operating system 316. The encrypted protected data is forwarded by open operating system 316 to device management client 317. Device management client 317 can then decrypt the encrypted protected data using the shared secret key, and process the protected data for device management purposes.

Advantageously, if malware user application 318 purports to act as a legitimate data management application and requests the protected data from open operating system 316, open operating system 316 would only receive the encrypted protected data from an API call to API 309. Thus, the malware user application 318 would also receive the protected data from open operating system 316 in an encrypted form, and would not be able to process or otherwise manipulate the protected data for malicious purposes.

Figure 5:
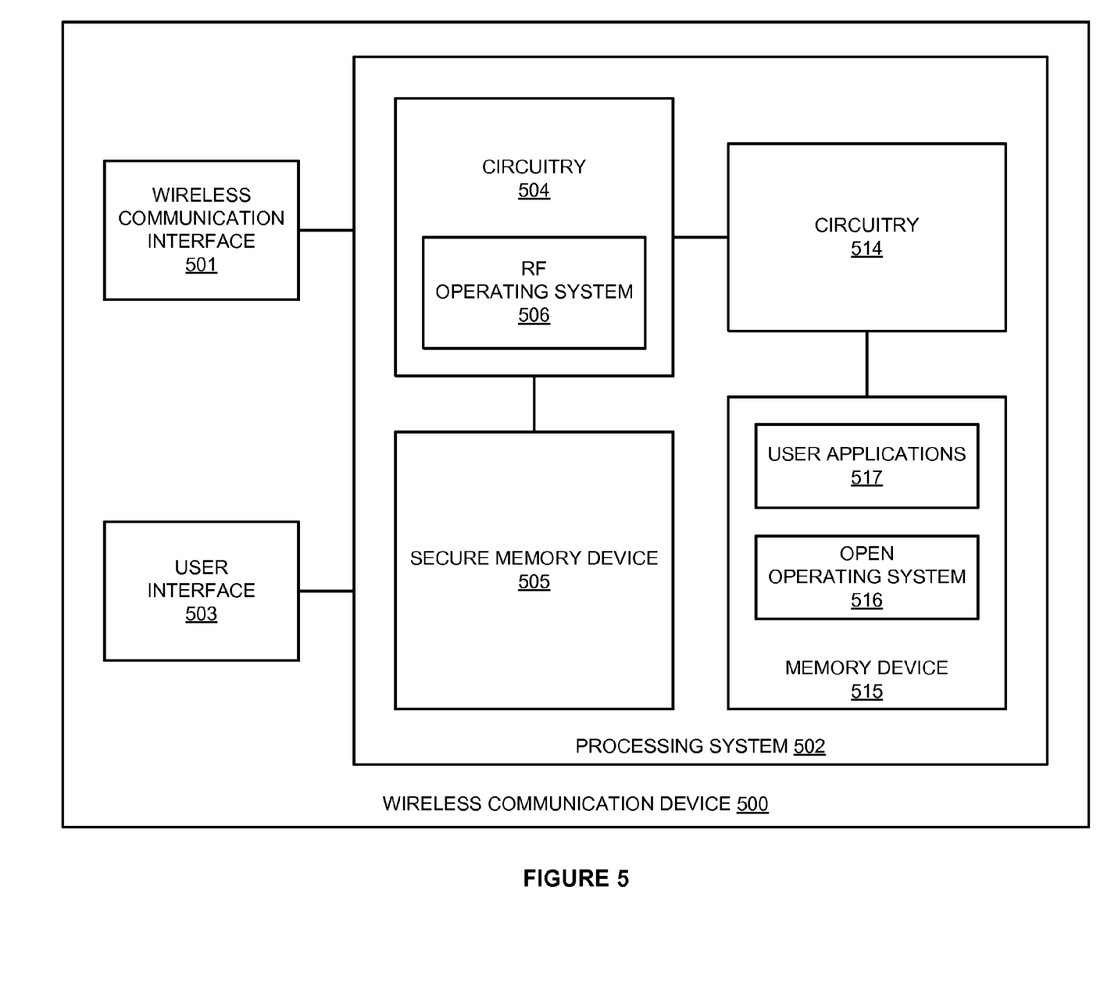
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication interface 501, processing system 502, and user interface 503. Processing system 502 is linked to wireless communication interface 501 and user interface 503. Processing system 502 includes first processing circuitry 504, secure memory device 505, second processing circuitry 514, and memory device 515. Memory device 515 stores open operating system 516 and a plurality of user applications 517. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication interface 501 comprises RF communication circuitry and an antenna. The RF communication circuitry typically includes an amplifier, filter, RF modulator, and signal processing circuitry. Wireless communication interface 501 may also include a memory device, software, processing circuitry, or some other communication device. Wireless communication interface 501 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication interface 501 may be configured to receive protected data and unprotected data.

User interface 503 comprises components that interact with a user to receive user inputs and to present media and/or information. User interface 503 may include a speaker, microphone, buttons, lights, display screen, touch screen, touch pad, scroll wheel, communication port, or some other user input/output apparatus—including combinations thereof. User interface 503 may be configured to receive protected data and unprotected data. User interface 503 may be omitted in some examples.

First processing circuitry 504 stores RF operating system 506. First processing circuitry 504 is linked to secure memory device 505. First processing circuitry 504 comprises microprocessor and other circuitry that executes RF operating system 506. Secure memory device 505 comprises a disk drive, flash drive, data storage circuitry, or some other memory apparatus. RF operating system 506 comprises computer software, firmware, or some other form of machine-readable processing instructions. RF operating system 506 may include utilities, drivers, network interfaces, applications, or some other type of software.

When executed by processing circuitry 504, RF operating system 506 directs processing system 502 to operate wireless communication device 500 as described herein for wireless communication device 101. In particular, RF operating system 506 directs processing system 502 to receive protected data and unprotected data and store the protected data and the unprotected data in secure memory device 505. Further, RF operating system 506 directs processing system 502 to retrieve the unprotected data from secure memory device 505 in response to a first request for the unprotected data from open operating system 516, and transfer the unprotected data to open operating system 516 for delivery to the one of the user applications 517 associated with the first request. In addition, RF operating system 506 directs processing system 502 to retrieve the protected data from secure memory device 505 in response to a second request for the protected data from open operating system 516, encrypt the protected data, and transfer the protected data to open operating system 516 for delivery to the one of the user applications 517 associated with the second request.

First processing circuitry 504 and second processing circuitry 514 are typically mounted on a circuit board that may also hold secure memory device 505, memory device 515, and portions of wireless communication interface 501 and user interface 503. Second processing circuitry 514 is linked to first processing circuitry 504 and memory device 515. Second processing circuitry 514 comprises microprocessor and other circuitry that executes open operating system 516 and user applications 517. Memory device 515 comprises a disk drive, flash drive, data storage circuitry, or some other memory apparatus. Open operating system 516 and user applications 517 comprise computer software, firmware, or some other form of machine-readable processing instructions. Open operating system 516 and user applications 517 may include utilities, drivers, network interfaces, applications, or some other type of software.

When executed by second processing circuitry 514, open operating system 516 directs processing system 502 to operate wireless communication device 500 as described herein for wireless communication device 101. In particular, open operating system 516 directs processing system 502 to receive a first request for the unprotected data from one of the user applications 517, transfer the first request to RF operating system 506, and receive the unprotected data from RF operating system 506 for delivery to the one of the user applications 517 associated with the first request. In addition, open operating system 516 directs processing system 502 to receive a second request for the protected data from one of the user applications 517, transfer the second request to RF operating system 506, and receive encrypted protected data from RF operating system 506 for delivery to the one of the user applications 517 associated with the second request.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising:
   first processing circuitry having a shared secret encryption key hardcoded therein, the first processing circuitry configured to execute a radio frequency (RF) operating system, wherein the first processing circuitry is linked to a secure memory device inaccessible to second processing circuitry and wherein the shared secret encryption key is shared with a communication service provider associated with the wireless communication device;
   the second processing circuitry configured to execute an open operating system and a plurality of user applications executing on the open operating system;
   the RF operating system configured to receive protected data comprising critical parameters encrypted by the communication service provider using the shared secret encryption key, decrypt the protected data using the shared secret encryption key, and store the protected data in the secure memory device without encryption;
   the open operating system configured to receive a request for the protected data from one of the user applications and transfer the request to the RF operating system; and
   in response to the request for the protected data, the RF operating system is configured to retrieve the protected data from the secure memory device, encrypt the protected data with the shared secret encryption key to generate encrypted protected data, and transfer the encrypted protected data to the open operating system for delivery to the one of the user applications associated with the request.

2. The wireless communication device of claim 1 wherein the RF operating system configured to encrypt the protected data comprises the RF operating system configured to encrypt the protected data based on receiving the request from the open operating system.

3. The wireless communication device of claim 1 wherein the RF operating system is configured to execute RF operations.

4. The wireless communication device of claim 1 wherein the RF operating system configured to receive the protected data comprises the RF operating system configured to receive the protected data through a wireless communication interface.

5. The wireless communication device of claim 1 wherein the RF operating system configured to receive the protected data comprises the RF operating system configured to receive the protected data transmitted from the communication service provider according to an over-the-air device management protocol.

6. The wireless communication device of claim 1 wherein the RF operating system configured to store the protected data in the secure memory device comprises an input/output (I/O) interface of the RF operating system configured to store the protected data in the secure memory device.

7. The wireless communication device of claim 1 wherein the RF operating system configured to store the protected data in the secure memory device comprises an input/output (I/O) interface of the RF operating system configured to store the protected data in the secure memory device, and wherein the RF operating system configured to retrieve the protected data from the secure memory device comprises the I/O interface configured to retrieve the protected data from the secure memory device.

8. The wireless communication device of claim 1 wherein the RF operating system is configured to receive the request into an application programming interface (API) of the RF operating system.

9. The wireless communication device of claim 8 wherein the RF operating system configured to encrypt the protected data comprises the API configured to encrypt the protected data, and wherein the RF operating system configured to transfer the encrypted protected data to the open operating system comprises the API configured to transfer the encrypted protected data to the open operating system for delivery to the one of the user applications associated with the request.

10. The wireless communication device of claim 1 wherein the first processing circuitry comprises a first core of a dual-core processor and wherein the second processing circuitry comprises a second core of the dual-core processor.

11. A method of operating a wireless communication device, wherein the wireless communication device comprises first processing circuitry and second processing circuitry, the first processing circuitry having a shared secret encryption key hardcoded therein, the first processing circuitry configured to execute a radio frequency (RF) operating system and the second processing circuitry configured to execute an open operating system and a plurality of user applications executing on the open operating system, wherein the first processing circuitry is linked to a secure memory device inaccessible to the second processing circuitry, and wherein the shared secret encryption key is shared with a communication service provider associated with the wireless communication device, the method comprising:

in the RF operating system, receiving protected data comprising critical parameters encrypted by the communication service provider using the shared secret encryption key, decrypting the protected data using the shared secret encryption key, and storing the protected data in the secure memory device without encryption;

in the open operating system, receiving a request for the protected data from one of the user applications and transferring the request to the RF operating system; and in the RF operating system, in response to the request for the protected data, retrieving the protected data from the secure memory device, encrypting the protected data with the shared secret encryption key to generate encrypted protected data, and transferring the encrypted protected data to the open operating system for delivery to the one of the user applications associated with the request.

12. The method of claim 11 wherein encrypting the protected data comprises encrypting the protected data based on receiving the request from the open operating system.

13. The method of claim 11 wherein the RF operating system is configured to execute RF operations.

14. The method of claim 11 wherein receiving the protected data comprises receiving the protected data through a wireless communication interface.

15. The method of claim 11 wherein receiving the protected data comprises receiving the protected data transmitted from the communication service provider according to an over-the-air device management protocol.

16. The method of claim 11 wherein storing the protected data in the secure memory device comprises an input/output (I/O) interface of the RF operating system configured to store the protected data in the secure memory device.

17. The method of claim 11 wherein storing the protected data in the secure memory device comprises an input/output (I/O) interface of the RF operating system storing the protected data in the secure memory device, and wherein retrieving the protected data from the secure memory device comprises the I/O interface retrieving the protected data from the secure memory device.

18. The method of claim 11 further comprising receiving the request into an application programming interface (API) of the RF operating system.

19. The method of claim 18 wherein encrypting the protected data comprises the API encrypting the protected data, and wherein transferring the encrypted protected data to the open operating system comprises the API transferring the encrypted protected data to the open operating system for delivery to the one of the user applications associated with the request.

20. A computer apparatus to operate a wireless communication device, wherein the wireless communication device comprises first processing circuitry and second processing circuitry, the first processing circuitry having a shared secret encryption key hardcoded therein, the first processing circuitry configured to execute a radio frequency (RF) operating system and the second processing circuitry configured to execute an open operating system and a plurality of user applications executing on the open operating system, wherein the first processing circuitry is linked to a secure memory device inaccessible to the second processing circuitry, and wherein the shared secret encryption key is shared with a communication service provider associated with the wireless communication device, the computer apparatus comprising:

the RF operating system configured, when executed by the first processing circuitry, to direct the first processing circuitry to receive protected data comprising critical parameters encrypted by the communication service provider using the shared secret encryption key, decrypt the protected data using the shared secret encryption key, and store the protected data in the secure memory device without encryption;

the open operating system configured, when executed by the second processing circuitry, to direct the second processing circuitry to receive a request for the protected data from one of the user applications and transfer the request to the RF operating system;

the RF operating system configured to direct the first processing circuitry to, in response to the request for the protected data, retrieve the protected data from the secure memory device, encrypt the protected data with the shared secret encryption key to generate encrypted protected data, and transfer the encrypted protected data to the open operating system for delivery to the one of the user applications associated with the request; and at least one non-transitory computer-readable storage medium storing the RF operating system and the open operating system.

* * * * *